United States Patent
Gamble et al.

(10) Patent No.: US 9,770,768 B2
(45) Date of Patent: Sep. 26, 2017

(54) ROTARY CUTTING TOOL WITH ANTI-ROTATION FEATURE

(71) Applicant: Kennametal Inc., Latrobe, PA (US)

(72) Inventors: Kevin Michael Gamble, Stahlstown, PA (US); James Michael Waggle, Derry, PA (US)

(73) Assignee: KENNAMETAL INC., Latrobe, PA (US)

( * ) Notice: Subject to any disclaimer, the term of this patent is extended or adjusted under 35 U.S.C. 154(b) by 217 days.

(21) Appl. No.: 14/696,155

(22) Filed: Apr. 24, 2015

(65) Prior Publication Data
US 2016/0311038 A1 Oct. 27, 2016

(51) Int. Cl.
*B23C 5/06* (2006.01)
*B23C 5/08* (2006.01)
*B23C 5/22* (2006.01)

(52) U.S. Cl.
CPC .............. *B23C 5/08* (2013.01); *B23C 5/2221* (2013.01); *B23C 5/2247* (2013.01); *B23C 5/22* (2013.01); *B23C 2200/128* (2013.01); *B23C 2200/367* (2013.01); *B23C 2210/161* (2013.01); *B23C 2210/168* (2013.01); *Y10T 407/192* (2015.01); *Y10T 407/194* (2015.01)

(58) Field of Classification Search
CPC .... B23C 5/06; B23C 5/22; B23C 5/20; B23C 5/08; B23C 2210/16; B23C 2210/161; B23C 2210/244; B23C 2210/168; B23B 2205/02
See application file for complete search history.

(56) References Cited

U.S. PATENT DOCUMENTS

| | | | | |
|---|---|---|---|---|
| 5,059,068 A | * | 10/1991 | Scott | B23B 27/04 175/412 |
| 6,116,823 A | * | 9/2000 | Mihic | B23C 5/08 407/109 |
| 6,234,727 B1 | * | 5/2001 | Barazani | B23B 27/04 407/110 |
| 6,299,389 B1 | * | 10/2001 | Barazani | B23B 27/04 144/173 |
| 7,517,178 B2 | * | 4/2009 | Martin | B27G 13/10 144/230 |
| 8,905,684 B2 | * | 12/2014 | Waggle | B23C 5/08 407/109 |
| 2008/0152439 A1 | * | 6/2008 | Andersson | B23C 5/2208 407/102 |

(Continued)

*Primary Examiner* — Daniel Howell
*Assistant Examiner* — Nicole N Ramos
(74) *Attorney, Agent, or Firm* — Ian K. Samways

(57) ABSTRACT

A rotary cutting tool, such as a slotting cutter, includes a cutter body rotatable in a predetermined direction on a central axis perpendicular to a plane of the cutter body. A plurality of cutting insert-receiving pockets are formed at predetermined locations about the cutter body. A cantilevered member can be integrally formed in the cutter body or attached to the cutter body as a separate component. A tip of the cantilevered member at least partially extends into each insert-receiving pocket such that the cantilevered member exerts a biasing force against a cutting insert at a location so as to counteract a tendency of the cutting insert to rotate within the insert-receiving pocket during a cutting operation.

19 Claims, 6 Drawing Sheets

(56) References Cited

U.S. PATENT DOCUMENTS

| | | | |
|---|---|---|---|
| 2008/0166191 A1* | 7/2008 | Andersson | B23C 5/2208 407/103 |
| 2008/0298922 A1* | 12/2008 | Oettle | B23C 5/08 409/137 |
| 2011/0305532 A1* | 12/2011 | Harif | B23C 5/06 407/40 |
| 2012/0082519 A1* | 4/2012 | Hecht | B23B 29/043 407/33 |
| 2012/0251251 A1* | 10/2012 | Volokh | B23C 5/08 407/47 |

* cited by examiner

ROTARY CUTTING TOOL WITH ANTI-ROTATION FEATURE

BACKGROUND OF THE INVENTION

Slotting cutters are known for cutting keyways and the like and, also, for providing work members with slots of various width.

Slotting cutters are somewhat similar to milling cutters in that the cutter usually employs a disc-like member having cutting inserts mounted in the periphery thereof. In a milling cutter, the cutting inserts are generally presented axially, whereas, in a slotting cutter, the cutting inserts protrude radially from the supporting disc and are, thus, presented to the work in the radial direction.

In order to form slots rapidly and efficiently, it is desirable that the cutting inserts be solidly supported in the cutter body and have adequate clearance between the cutting edges of the inserts and the cutter body as the material is removed from the work piece. With the inserts solidly supported and having sufficient clearance between the cutter body and the cutting edges, the slotting cutter is able to withstand substantial loads and can cut extremely rapidly, freely and accurately.

During a cutting operation in a conventional milling cutter 100, such as a slotting cutter shown in FIG. 6, the cutting load (indicated by the downward arrow) is located at the cutting tip 132 of the cutting insert 130. This downward force exerted by the cutting load is counteracted by an upward force (indicated by the upward arrow) exerted by the interaction of the cutting insert 130 contacting the axial support surface 104 of the insert pocket 102. However, the radially outermost location 134 in which the cutting insert 130 contacts the axial support surface 104 the pocket 102 is located radially inward with respect the cutting load located at the cutting tip 132. This radial difference in the locations of the cutting load and the outermost location 134 in which the cutting insert 130 is supported by the pocket 102 produces a tendency for the cutting insert 130 to rotate about its vertical axis 136 (indicated by the arcuate arrow). Unfortunately, existing pocket designs are inadequate in preventing this tendency of the cutting insert to rotate in the pocket during a cutting operation.

SUMMARY OF THE INVENTION

The problem of the preventing rotation of the cutting insert due to cutting loads has been solved by providing an insert-receiving pocket with a flexible geometric feature, such as a cantilevered member, to exert a biasing force against the cutting insert at a location to counteract the tendency of the insert to rotate within the pocket during a cutting operation.

In one aspect of the invention, a rotary cutting tool comprises a cutter body rotatable in a predetermined direction on a central axis. A plurality of cutting insert-receiving pockets are formed at predetermined locations about the cutter body. A cantilevered member is integrally formed in the cutter body such that a tip of the cantilevered member at least partially extends into each insert-receiving pocket. The cantilevered member exerts a biasing force against a cutting insert at a location so as to counteract a tendency of the cutting insert to rotate within the insert-receiving pocket during a cutting operation.

In another aspect of the invention, a slotting cutter comprises a disc-like cutter body rotatable in a predetermined direction on a central axis perpendicular to a plane of the cutter body. A plurality of insert-receiving pockets are formed about a perimeter of the cutter body. Each insert-receiving pocket includes a bottom support surface, a radial support surface and an axial support surface. A cantilevered member is formed in the cutter body such that a tip of the cantilevered member at least partially extends into each insert-receiving pocket. The cantilevered member exerts a biasing force against a cutting insert at a location so as to counteract a tendency of the cutting insert to rotate within the insert-receiving pocket during a cutting operation.

In yet another aspect of the invention, a rotary cutting tool comprises a cutter body rotatable in a predetermined direction on a central axis. A plurality of cutting insert-receiving pockets are formed at predetermined locations about the cutter body. A cantilevered member is attached to the cutter body such that a tip of the cantilevered member at least partially extends into each insert-receiving pocket. The cantilevered member exerts a biasing force against a cutting insert at a location so as to counteract a tendency of the cutting insert to rotate within the insert-receiving pocket during a cutting operation.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
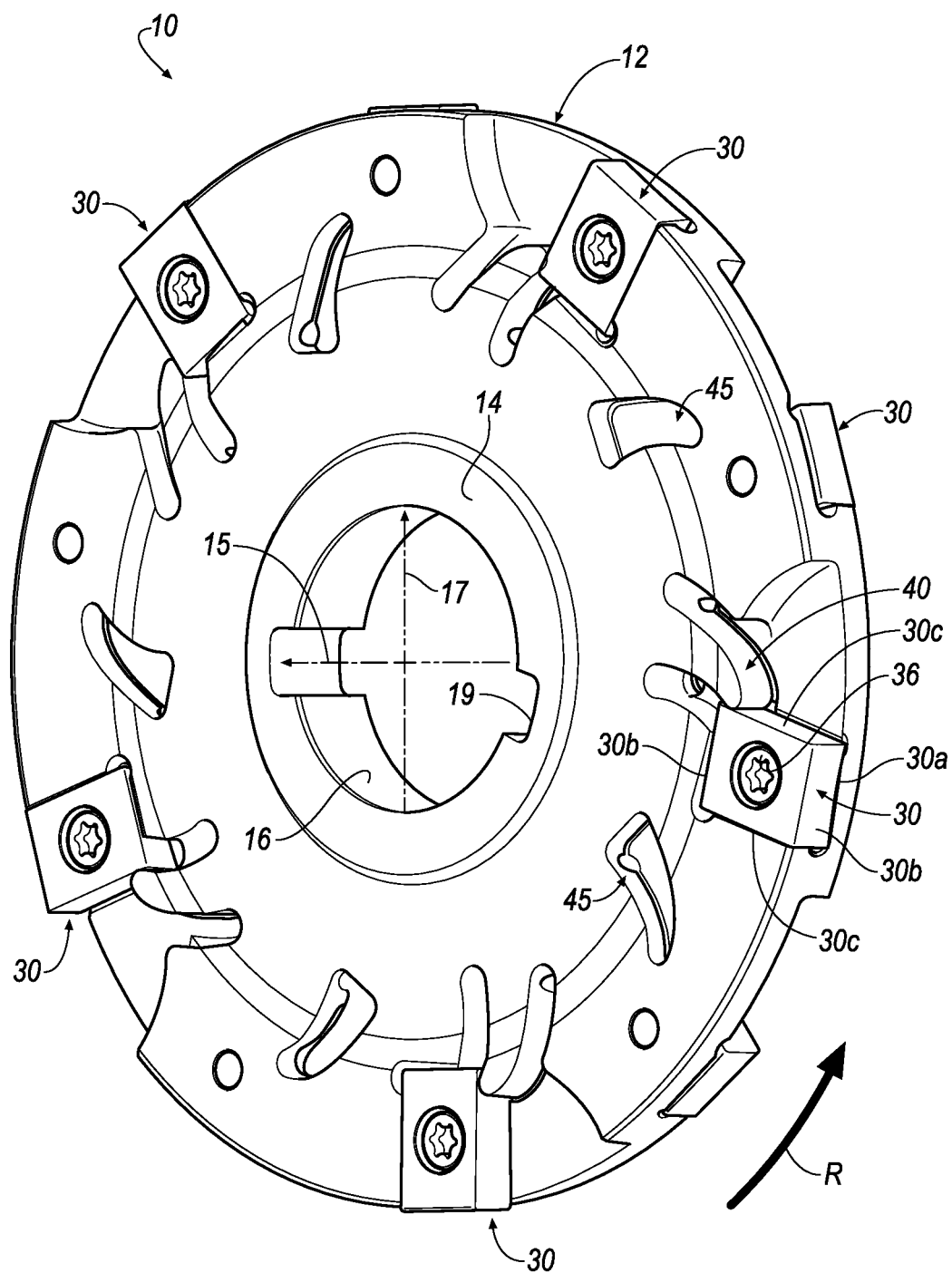
FIG. 1 is a perspective view of a slotting cutter with an anti-rotation feature in the form of a cantilevered member according to an embodiment of the invention.

Referring now to FIGS. 1-5, a rotary cutting tool 10 is shown according to an embodiment of the invention. In the illustrated embodiment, the rotary cutting tool 10 comprises a slotting cutter including a disc-like cutter body 12 having a central hub region 14 that is provided with a bore 16 for receiving a support shaft (not shown). The slotting cutter 10 rotates on a central axis 15 perpendicular to a plane 17 of the cutter body 12 in a predetermined direction (indicated by the arrow R). The central hub region 14 may also be provided with an optional keyway 19 for receiving a drive key (not shown).

In the illustrated embodiment, the slotting cutter 10 includes a plurality of cutting insert-receiving pockets 20 formed at predetermined location about the cutter body 12 for receiving a cutting insert 30. In the illustrated embodiment, the slotting cutter 10 includes ten (10) insert-receiving pockets 20 formed about the periphery of the cutter body 12 at equally spaced intervals. However, it will be appreciated that the invention is not limited by the number of insert-receiving pockets 20, and that any suitable number of pockets 20 may be formed about the cutter body 12, depending on the desired material of the work piece to be cut and the physical dimensions of the cutter body 12.

Figure 4:
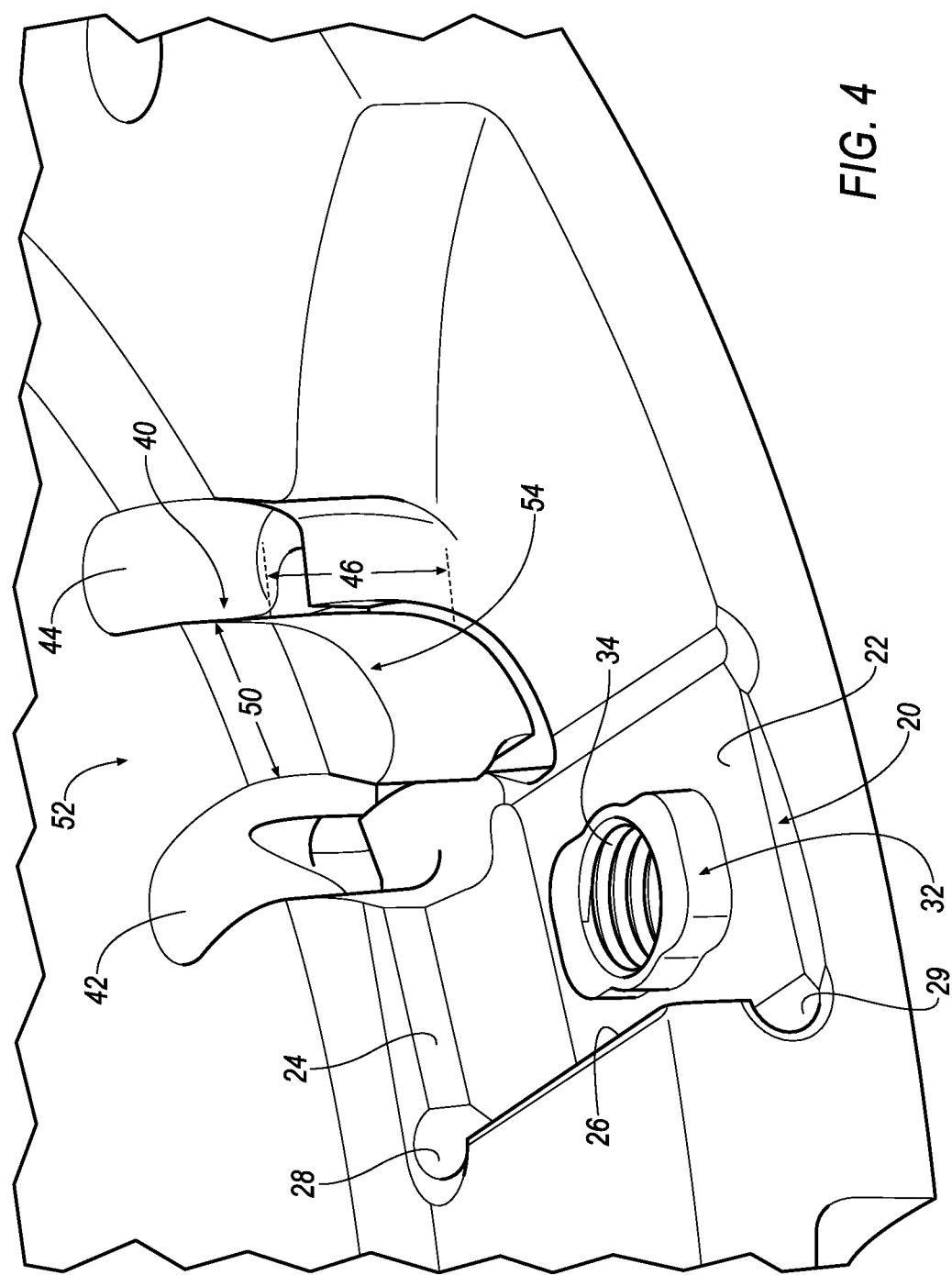
FIG. 4 is an enlarged perspective view of the insert-receiving pocket of the slotting cutter of FIG. 3 with the cutting insert removed for clarity.

Each insert-receiving pocket 20 includes a bottom support surface 22, a radial support surface 24, and an axial support surface 26. The insert-receiving pocket 20 may also include a corner relief 28 between the radial support surface 24 and the axial support surface 26, and a corner relief 29 between the bottom support surface 22 and the axial support surface 26 (FIG. 4). In one embodiment, the radial support surface 24 is substantially perpendicular to the axial support surface 26. However, it will be appreciated that the invention is not limited by the relative angle between the radial and axial support surfaces 24, 26, and that the invention can be practiced with the radial and axial support surfaces 24, 26 being non-perpendicular to each other.

Figure 2:
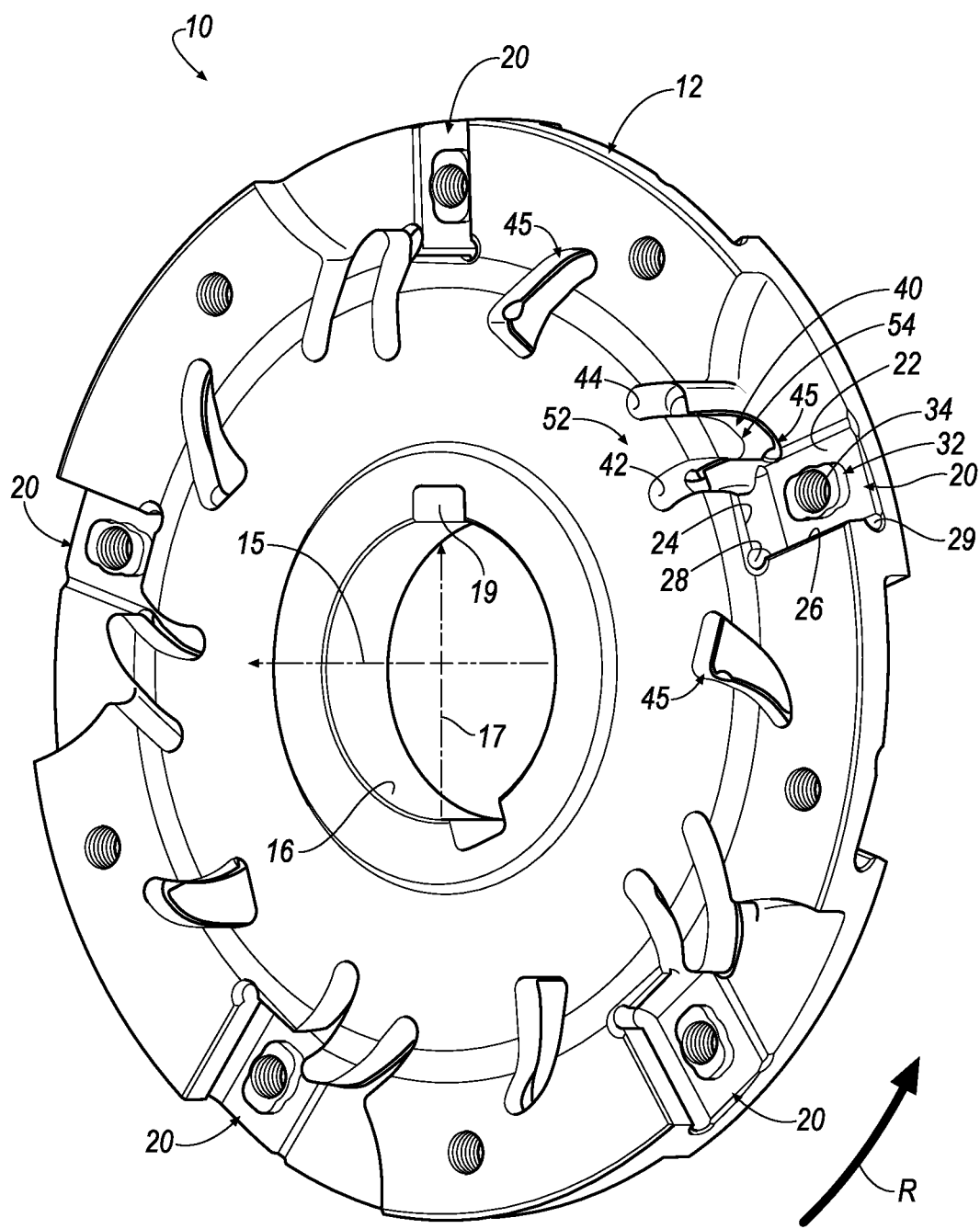
FIG. 2 is a perspective view of the slotting cutter of FIG. 1 with the cutting inserts removed for clarity.

As shown in FIG. 1, a cutting insert 30 is tangentially mounted in each insert-receiving pocket 20 of the cutter body 12. As shown in FIG. 2, the bottom support surface 22 may include a central raised portion 32 with a threaded bore 34 for receiving a mounting screw 36 to mount the cutting insert 30 in the pocket 20. The central raised portion 32 is received within a complimentary-shaped recess (not shown) in the cutting insert 30. In the illustrated embodiment, the central raised portion 32 has a non-circular profile to assist in properly locating the cutting insert 30 in the pocket 20.

When the cutting insert 30 is properly mounted in the pocket 20, the bottom support surface 22 of the pocket 20 contacts the bottom surface 30a of the cutting insert 30. In addition, the radial support surface 24 of the pocket 20 contacts one of the peripheral side surfaces 30b of the cutting insert 30, and the axial support surface 26 contacts another one of the peripheral side surfaces 30c of the cutting insert 30, thereby providing three-point contact when the cutting insert 30 is mounted in the pocket 20. The bottom support surface 22 of the pocket 20 is complementary in shape to the bottom surface 30a of the cutting insert 30, while the side surfaces 30b, 30c of the cutting insert 30 are complementary in shape to the radial and axial support surfaces 24, 26 of the pocket 20, respectively.

In the illustrated embodiment, the cutting insert 30 is a single-sided cutting insert with a four cutting edges (i.e. two right-handed cutting edges 180 degrees apart, and two left-handed cutting edges 180 degrees apart) that can be selectively presented to a working position by unthreading the mounting screw 36 from the threaded bore 34 until the cutting insert 30 is able to be removed from the insert-receiving pocket 20, removing the cutting insert 30, and rotating the cutting insert 30 one-hundred eighty (180) degrees about a vertical axis, and then again mounting the cutting insert 30 in the cutter body 12. In the illustrated embodiment, the cutting insert 30 can be mounted on the opposite side of the slotting cutter 10 to present the two left-handed cutting edges if the two right-handed cutting edges were already presented to the workpiece, and vice versa.

Figure 3:
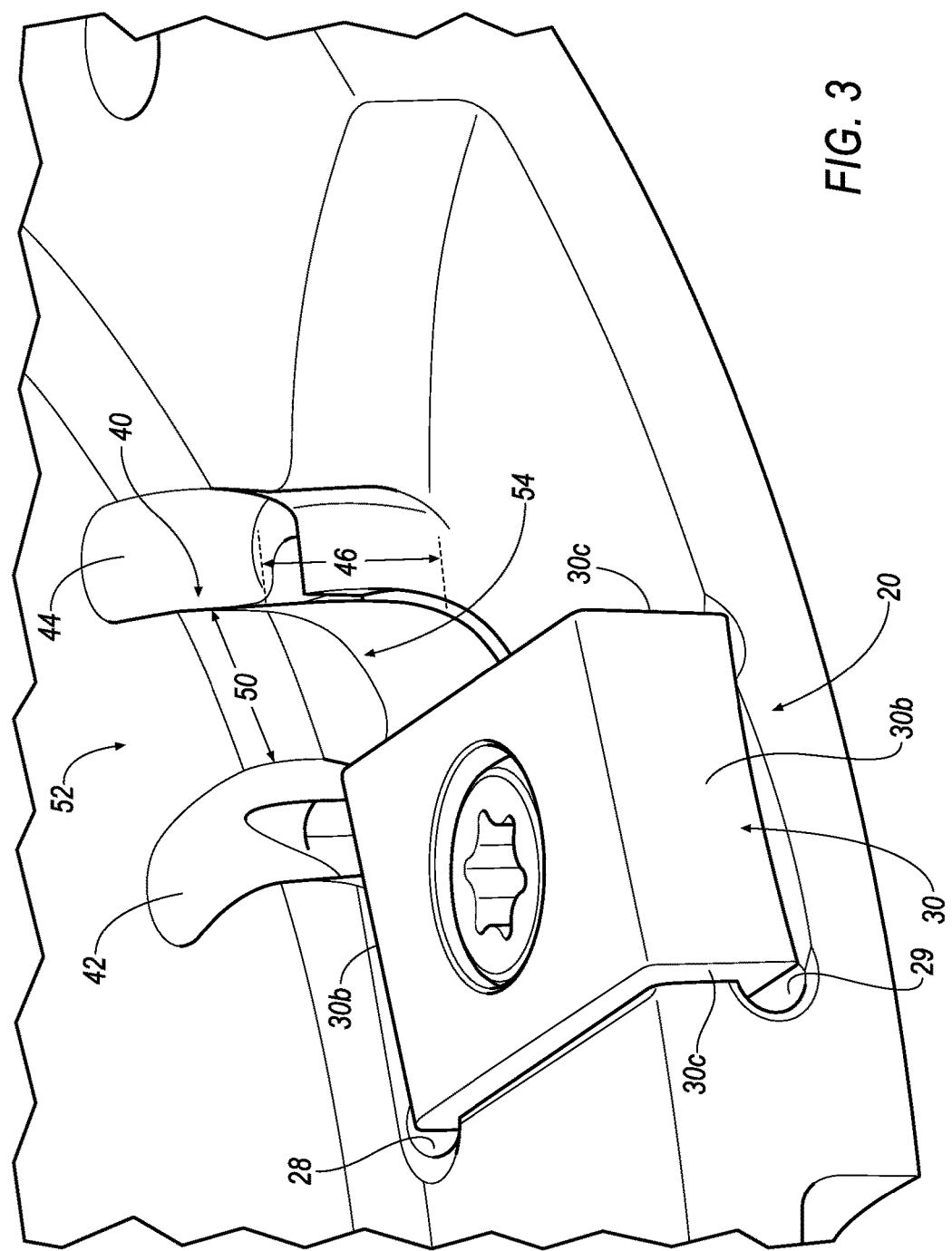
FIG. 3 is an enlarged perspective view of the insert-receiving pocket of the slotting cutter with the anti-rotation feature in the form of a cantilevered member according to an embodiment of the invention.
Figure 5:
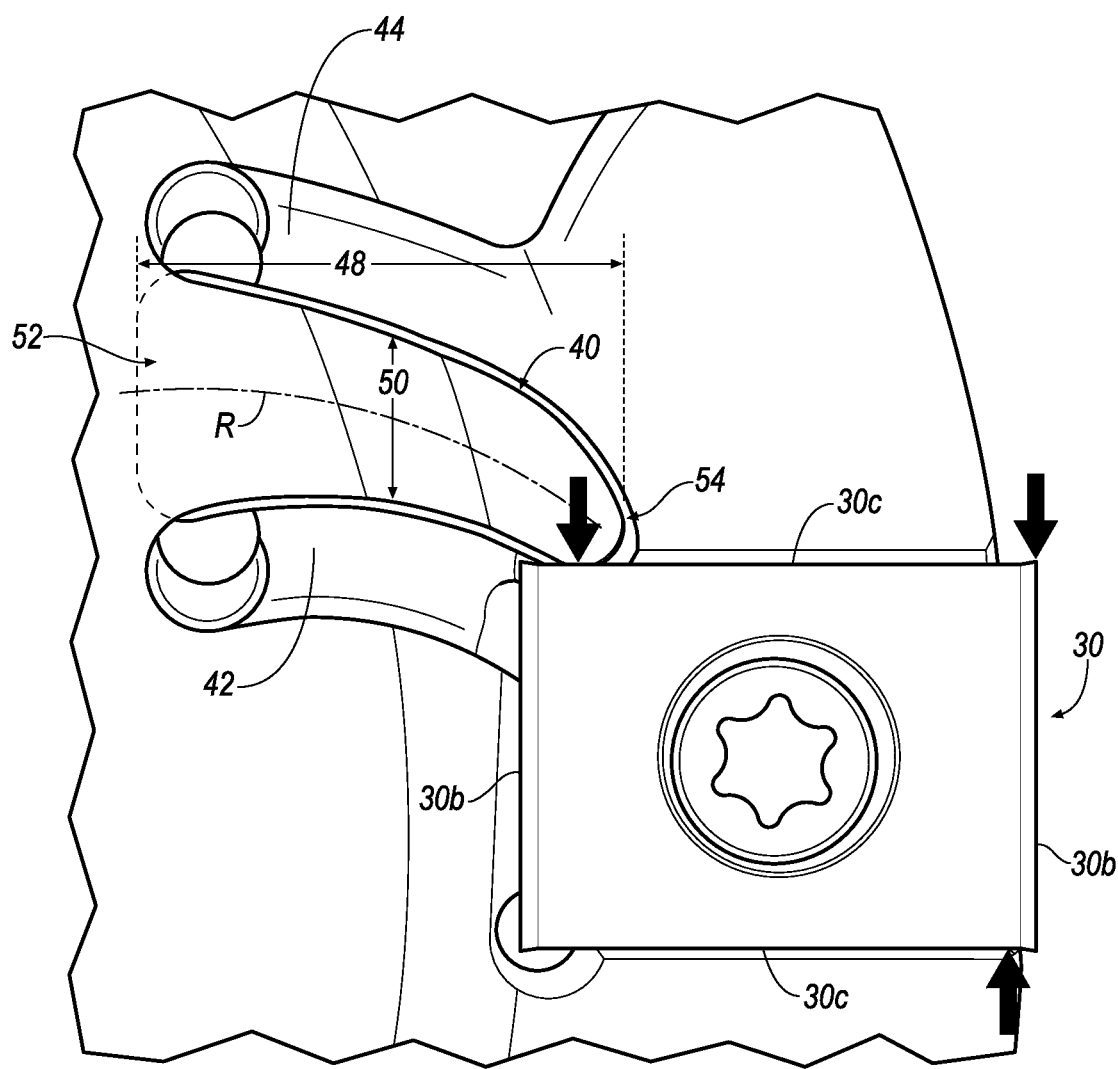
FIG. 5 is an enlarged top view of the insert-receiving pocket of the slotting cutter of FIG. 3.
Figure 6:
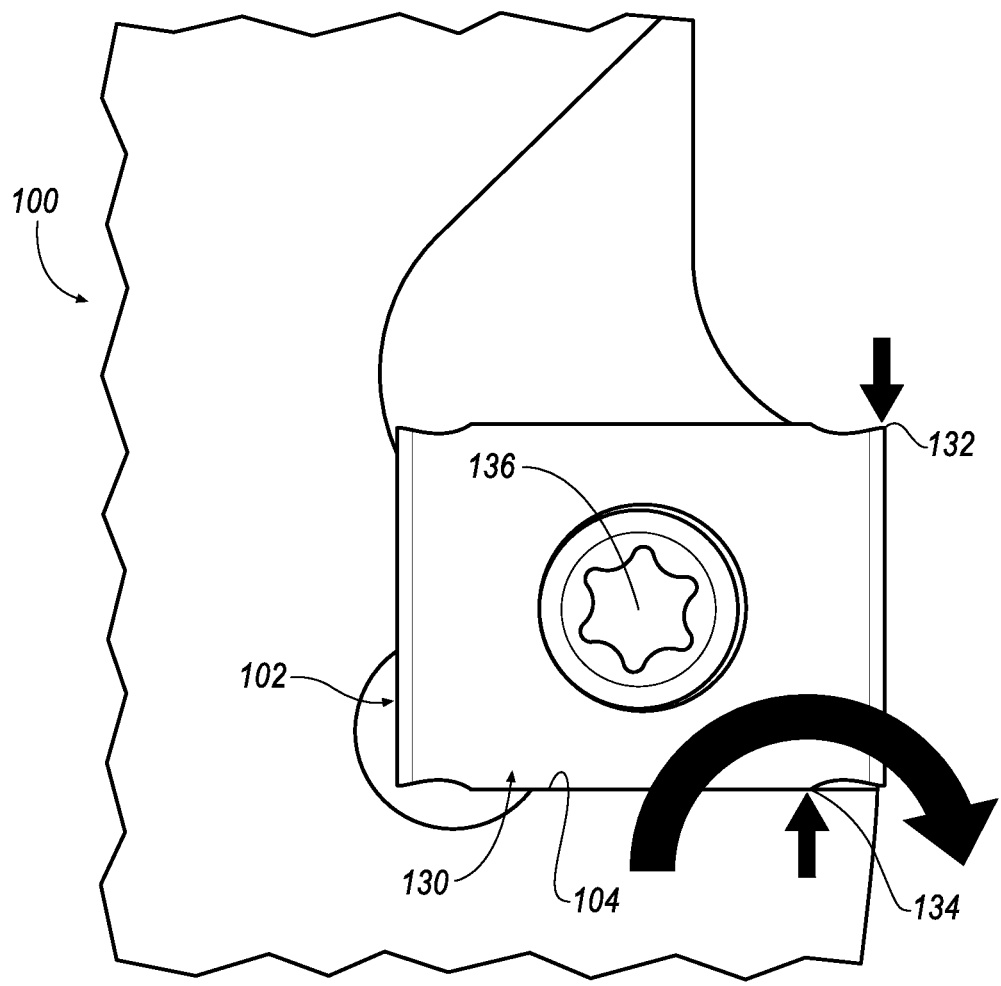
FIG. 6 is an enlarged top view of an insert-receiving pocket of a conventional slotting cutter.

As shown in FIGS. 3-5, one aspect of the invention is that the cutter body 12 includes an anti-rotation feature, shown generally at 40. In the illustrated embodiment, the anti-rotation feature 40 is in the form of a cantilevered member that extends in a radial direction from the cutter body 12. As used herein, a cantilever is a projecting beam or member that is supported at only one end. In general, the cantilevered member 40 is disposed between a pair of slots 42, 44 formed in the cutter body 12. In addition, the cantilevered member 40 is located opposite a pocket 45 formed in an opposite side of the cutter body 12. The pocket 45 extends to the slots 42, 44, thereby creating an opening underneath the cantilevered member 40. The slots 42, 44 and the pocket 45 allow the cantilevered member 40 to freely flex. In the illustrated embodiment, the cantilevered member 40 is integrally formed in the cutter body 12 by machining the slots 42, 44 and the pocket 45 in the cutter body 12, thereby providing a cost-effective means for manufacturing the cantilevered member 40. However, it will be appreciated that the cantilevered member 40 can be a separate component that is attached to the cutter body 12, instead of being machined into the cutter body 12.

In the illustrated embodiment, the cantilevered member 40 has a substantially uniform thickness 46 along its entire length 48. The opening 45 determines the thickness 46 of the cantilevered member 40. The cantilevered member 40 has a varying width 50 along the length 48. Specifically, the cantilevered member 40 has a greater width 50 proximate the base 52 and a smaller width 50 proximate the tip 54. The width 50 provides the desired flexibility to the cantilevered member 40 and can be selectively adjusted to vary the amount of flexibility of the cantilevered member 40 based on the material properties of the cutter body 12.

The cantilevered member 40 does not radially extend in a linear direction from the cutter body 12, but is formed with a radius, R, such that the cantilevered member 40 radially extends in a non-linear direction and bends in a downward direction toward the insert-receiving pocket 20, as shown in FIG. 5. It will be appreciated that the flexibility of the cantilevered member 40 can also be selectively adjusted by varying the magnitude of the radius, R. For example, the smaller the radius, R, the less flexible the cantilevered member 40 as compared with the cantilevered member 40 having a greater radius, R, for the same thickness 46, length 48 and width 50. However, it has been shown that the length 48 and the varying width 50 have a more significant impact on the flexibility and, therefore clamping force of the cantilevered member 40 than the magnitude of the radius, R.

The length 48 of the cantilevered member 40 is sufficient such that the tip 54 of the cantilevered member 40 at least partially extends into the insert-receiving pocket 20 in such a way that the tip 54 contacts the cutting insert 30 when mounted in the pocket 20. Specifically, the tip 54 of the cantilevered member 40 contacts one of the side peripheral surfaces 30c of the cutting insert 30 and acts as a spring to exert a biasing force against the cutting insert 30 when the cutting insert 30 is mounted in the insert-receiving pocket 20. As shown in FIG. 5, this biasing force is located so as to counteract the tendency of the cutting insert 30 to rotate within the insert-receiving pocket 20, thereby providing an anti-rotation feature of the invention.

As described above, the slotting cutter 10 of the invention includes an anti-rotation feature comprising a cantilevered member 40 that provides a biasing force against the cutting insert 30 to prevent the tendency of the cutting insert 30 to rotate within the insert-receiving pocket 20 during machining operations. In the illustrated embodiment, a slotting cutter 10 is shown and described. However, it will be appreciated that the principles of the anti-rotation feature of the invention can be applied to other types of rotary cutting tools, such as a milling cutter, a boring bar, and the like, in which the cutting inserts 30 are tangentially mounted within the insert-receiving pockets 20.

The patents and publications referred to herein are hereby incorporated by reference.

Having described presently preferred embodiments the invention may be otherwise embodied within the scope of the appended claims.

What is claimed is:

1. A rotary cutting tool, comprising:
   a cutter body rotatable in a predetermined direction on a central axis;
   a plurality of insert-receiving pockets formed at predetermined locations about the cutter body, each insert-receiving pocket including a radial support surface; and
   a cantilevered member integrally formed in the cutter body such that a tip of the cantilevered member at least partially extends into each insert-receiving pocket,
   wherein the cantilevered member extends in a radial direction from the cutter body,
   wherein the cantilevered member exerts a biasing force against a cutting insert at a location so as to counteract a tendency of the cutting insert to rotate within the insert-receiving pocket during a cutting operation.

2. The rotary cutting tool according to claim 1, wherein the cantilevered member has a thickness, a length and a varying width.

3. The rotary cutting tool according to claim 2, wherein the width is greater proximate a base of the cantilevered member.

4. The rotary cutting tool according to claim 1, wherein the cantilevered member is formed with a radius, R.

5. The rotary cutting tool according to claim 1, wherein the cantilevered member is disposed between a pair of slots formed in the cutter body and located opposite a pocket formed in an opposite side of the cutter body to allow the cantilevered member to freely flex.

6. The rotary cutting tool according to claim 1, wherein each insert-receiving pocket includes a bottom support surface, a radial support surface and an axial support surface.

7. The rotary cutting tool according to claim 6, wherein the bottom support surface includes a central raised portion having a non-circular profile to assist in properly locating the cutting insert in the insert-receiving pocket.

8. The rotary cutting tool according to claim 7, wherein the cutting insert is mounted within the insert-receiving pocket by threading a mounting screw into a threaded bore formed in the central raised portion.

9. The rotary cutting tool according to claim 1, wherein the tip of the cantilevered member contacts a side peripheral surface of the cutting insert when the cutting insert is mounted within the insert-receiving pocket.

10. A slotting cutter, comprising:
    a disc-like cutter body rotatable in a predetermined direction on a central axis perpendicular to a plane of the cutter body;
    a plurality of insert-receiving pockets formed about a perimeter of the body, each insert-receiving pocket including a bottom support surface, a radial support surface and an axial support surface; and
    a cantilevered member formed in the cutter body such that a tip of the cantilevered member at least partially extends into each insert-receiving pocket,
    wherein the cantilevered member exerts a biasing force against a cutting insert at a location so as to counteract a tendency of the cutting insert to rotate within the insert-receiving pocket during a cutting operation.

11. The slotting cutter according to claim 10, wherein the cantilevered member has a thickness, a length and a varying width.

12. The slotting cutter according to claim 11, wherein the width is greater proximate a base of the cantilevered member.

13. The slotting cutter according to claim 10, wherein the cantilevered member is formed with a radius, R.

14. The slotting cutter according to claim 10, wherein the cantilevered member is disposed between a pair of slots formed in the cutter body and located opposite a pocket formed in an opposite side of the cutter body to allow the cantilevered member to freely flex.

15. The slotting cutter according to claim 10, wherein the bottom support surface includes a central raised portion having a non-circular profile to assist in properly locating the cutting insert in the insert-receiving pocket.

16. The slotting cutter according to claim 15, wherein the cutting insert is mounted within the insert-receiving pocket by threading a mounting screw into a threaded bore formed in the central raised portion.

17. The slotting cutter according to claim 10, wherein the tip of the cantilevered member contacts a side peripheral surface of the cutting insert when the cutting insert is mounted within the insert-receiving pocket.

18. A rotary cutting tool, comprising:
    a cutter body rotatable in a predetermined direction on a central axis;
    a plurality of insert-receiving pockets formed at predetermined locations about the cutter body, each insert-receiving pocket including a radial support surface; and
    a cantilevered member, comprising a component separate from the cutter body, which is attached to the cutter body such that a tip of the cantilevered member at least partially extends in a radial direction into each insert-receiving pocket,
    wherein the cantilevered member exerts a biasing force against a cutting insert at a location so as to counteract a tendency of the cutting insert to rotate within the insert-receiving pocket during a cutting operation.

19. The rotary cutting tool according to claim 18, wherein the cantilevered member is disposed between a pair of slots formed in the cutter body and located opposite a pocket formed in an opposite side of the cutter body to allow the cantilevered member to freely flex.

\* \* \* \* \*